July 9, 1957     M. BRUMA     2,798,934
ELECTRICAL SPARK MACHINING DEVICES
Filed Feb. 7, 1955     3 Sheets-Sheet 1

INVENTOR
MARC BRUMA
BY
Bailey, Stephens and Huettig
ATTORNEYS

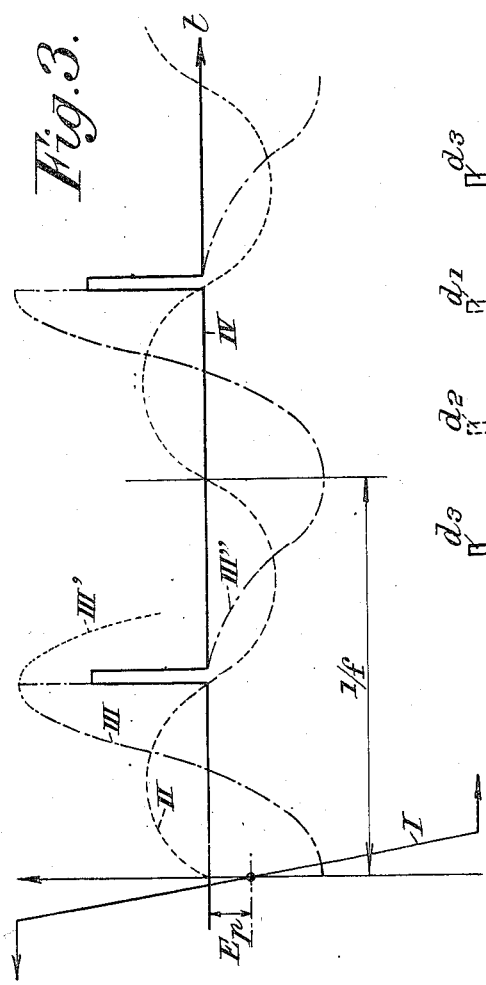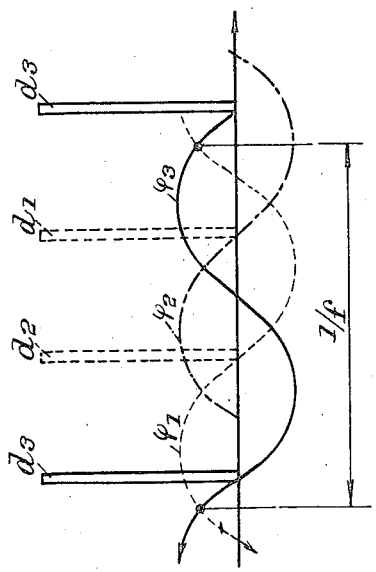

United States Patent Office 2,798,934
Patented July 9, 1957

2,798,934

ELECTRICAL SPARK MACHINING DEVICES

Marc Bruma, Pavillons-sous-Bois, France, assignor to Centre National de la Recherche Scientifique, Paris, France, a society of France Application February 7, 1955, Serial No. 486,626

Claims priority, application France February 22, 1954

3 Claims. (Cl. 219—69)

The present invention relates to electrical spark machining devices, that is to say devices making use of the electro-erosion phenomenon caused by intermittent electric sparks to machine any electro-conductive metal or alloy, whatever be the hardness thereof, by means of tools constituted by metals or alloys of substantially lower hardness, for instance copper or copper alloy tools. My invention is concerned with devices of this kind in which the electrical energy for the operation of the device is in the form of an alternating voltage.

The object of the present invention is to provide a device of this kind which is better adapted to meet the requirements of practice than those used up to the present time for the same purposes.

According to my invention, ferro-resonant magnetic switching means are provided automatically to control the action of said voltage so as to supply unidirectional current discharges between the electrode-tool and the work piece without the alternating voltage having to be rectified through the conventional means.

Preferred embodiments of the present invention will be hereinafter described with reference to the accompanying drawings, given merely by way of example and in which:

Fig. 3 shows curves illustrating the operation of the device of Fig. 1.

Fig. 5 shows curves illustrating the operation of the device of Fig. 4.

Up to this time, such machining devices made use of conventional rectifying means to obtain unidirectional current discharges between the electrode-tool and the work. Such conventional rectifying means involve considerable difficulties, because, to obtain high machining rates, it is necessary to rectify high voltages, high currents and high frequencies.

The object of the present invention is to eliminate these drawbacks.

For this purpose, according to the invention, I provide ferro-resonant magnetic switching means which permit voltage from the source to act in the circuit portion between the electrode-tool and the piece of work only when said voltage has the desired polarity. In this way I obtain unidirectional current discharges between the electrode-tool and the work.

Figure 1:
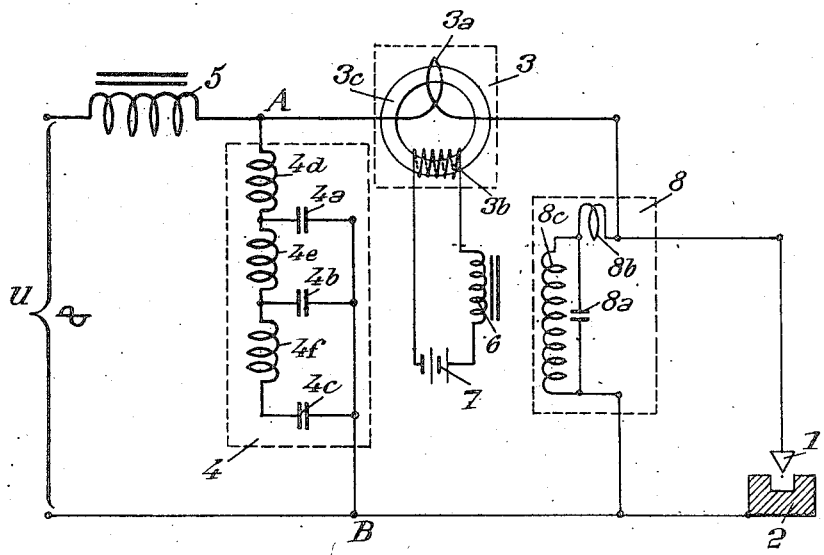
Fig. 1 shows the lay-out of a first embodiment of the present ivnention.

For instance, as shown by Fig. 1, the machining sparks are obtained between electrode-tool 1 and piece of work 2 by means of an alternating voltage supplied between A and B and acting through such an automatic switching means 3 which enables unidirectional current discharges to flow.

The switching means illustrated by the drawings by way of example comprises a closed magnetic circuit $3c$, for instance of toroidal shape, made of thin strips of an alloy having a high initial magnetic permeability and a sudden saturation of the so-called "ferro-resonant" type. On this magnetic circuit are disposed two windings, one $3a$ made of some turns of a big copper wire or even copper tube, the other made of a fine metallic wire $3b$, said windings being electrically insulated from each other. Fine wire winding $3b$ communicates through self-inductance 6 with a bias source 7, and only a low intensity direct current flows therethrough, whereas through the big wire winding are passing current peaks of short duration and high intensity, these current peaks being due to sudden discharge into the gap between electrode 1 and work 2.

Figure 2:
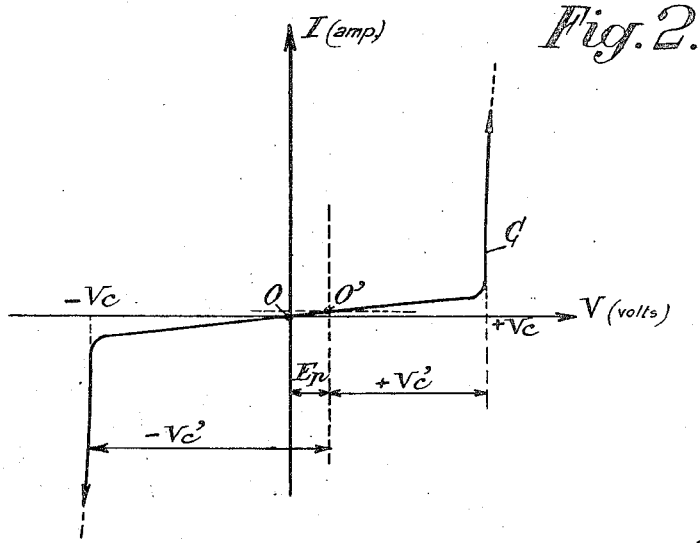
Fig. 2 shows a curve illustrating the operation of the current switching means.

The operation of the device of Fig. 1 will be better understood by reference to Fig. 2.

On this figure I have shown at C the curve showing the variation of the current intensity as a function of the voltage for the electromagnetic means 3, an alternating voltage of amplitude V being fed to coil $3a$. As long as this voltage is lower than a critical value Vc (for the frequency that is considered), the current flowing through said coil is very low (low slope portion of the curve of Fig. 2). But as soon as this critical value Vc is reached, the current increases very suddenly (substantially vertical branches of curve C), being practically limited only by the ohmic resistance of the coil. If there is no external bias, the curve is symmertical with respect to the value zero of the voltage (the absolute values of $+Vc$ and $-Vc$ are equal). On the contrary, if a polarizing direct voltage Ep is applied on the bias coil $3b$, the same phenomenons take place with a displacement of the origin of the curve C from O to O' so that the positive critical value $+Vc'$ is lower in absolute value than the negative critical value $-Vc'$. Therefore, in the case that is being considered, as soon as the alternating voltage exceeds, during a positive alternation, value Vc, a current peak of short duration and high intensity flows through winding $3a$. Therefore, owing to the provision of a suitable bias (Ep), voltage variation of an amplitude just little higher than $+Vc'$ and smaller than $-Vc'$ in absolute value will cause a high current peak to be produced for a very short time when said alternating voltage is passing through its maximum values in the positive direction.

The device according to the present invention may include only these elements, with the exclusion of the other elements shown on Fig. 1 and which will be hereinafter referred to.

However it is preferable to constitute the device as it will be hereinafter described in order to obtain particular advantages.

In this case, a source of alternating voltage is connected at the terminals of a reactive energy accumulating system. If this system is disposed in a circuit which can work in resonance with the frequency of the alternating source, it is possible to obtain high voltage maximums.

The reactive energy accumulator system 4 may be constituted by a delay line including condensers $4a$, $4b$, $4c$, and self inductance coils $4d$, $4e$, $4f$, this delay line being mounted in series with a self-inductance coil 5 so as to be tuned to the frequency of source U which is for instance constituted by an alternator. The delay line 4 being inserted between points A and B, it is thus possible to obtain between A and B voltage maximums considerably higher than those of source U. These voltage maximums are then applied on switching means 3.

It should be well understood that in an arrangement such as disclosed by Fig. 1, the reactive energy accumulating system 4 might be replaced by a mere condenser or a set of condensers or by any suitable reactive impedance. Furthermore, a distinct coil 5 may be dispensed with and replaced by the internal self-inductance of source U itself.

Whatever be the specific construction, the transient voltage wave which is produced across the terminals of the reactive energy accumulator system 4 has successive maximums of opposed polarities. In the arrangement illustrated by Fig. 1, the elements are preferably designed in such manner that these maximums take place at the times when the voltage of source U passes through zero. As above stated, the amplitude of these maximums is substantially higher than the voltage variation across the terminals of source U. In Fig. 3 which will be referred to more specifically hereinafter, the curve II shows, as a function time, the variations of the voltage of source U and curves III—III' the variations of the voltage across the terminals of the reactive energy accumulator system, portion III' of this curve corresponding to what would take place if the switching means did not exist.

Such switching means serve to produce the sudden discharge of the energy stored up in the reactance of the accumulator system 4, thus producing a short duration high intensity current peak at the very time the transient voltage wave passes through its maximum.

I will now refer to the curves of Fig. 3.

On Fig. 3, the curve C of Fig. 2 has been shown, but with its axes rotated through an angle of 90°. Curve II shows the variations as a function of time of the voltage across the terminals of source U. Curve III, III'' shows the variations as a function of time of the voltage across the terminals of the switching means 3. Curve IV shows the variations of current as a function of time in the winding 3a of the switching means and therefore the variation of voltage or current between the electrode-tool and the piece to be machined. The polarizing voltage $E_D$ is chosen such that only the positive maximums of the transient voltage wave can reach the critical voltage and cause a high intensity current peak to flow through winding 3a. Therefore these current peaks are unidirectional.

Magnetic materials suitable for making such switching means are well known in the art and available on the market.

It should be added, with reference to Fig. 1, that there is advantageously provided, in parallel between the electrode-tool 1 and piece 2, at least one coupling impedance 8. The object of this impedance, which is not absolutely necessary, is to adapt the impedance of the whole of parts 3 and 4 to the dynamic impedance of the machining discharges and therefore to improve the operation of the device. In the construction illustrated by Fig. 1, this coupling impedance is constituted by a system including: a condenser 8a the capacity of which is substantially lower than that of condensers 4a, 4b, 4c taken separately, and self-inductance coils 8b and 8c, the value of inductance 8b being substantially lower than that of 5, whereas the value of inductance 8c is several times higher than that of inductance 5.

It should be well understood that impedance 8 might be replaced by a transformer.

Figure 4:
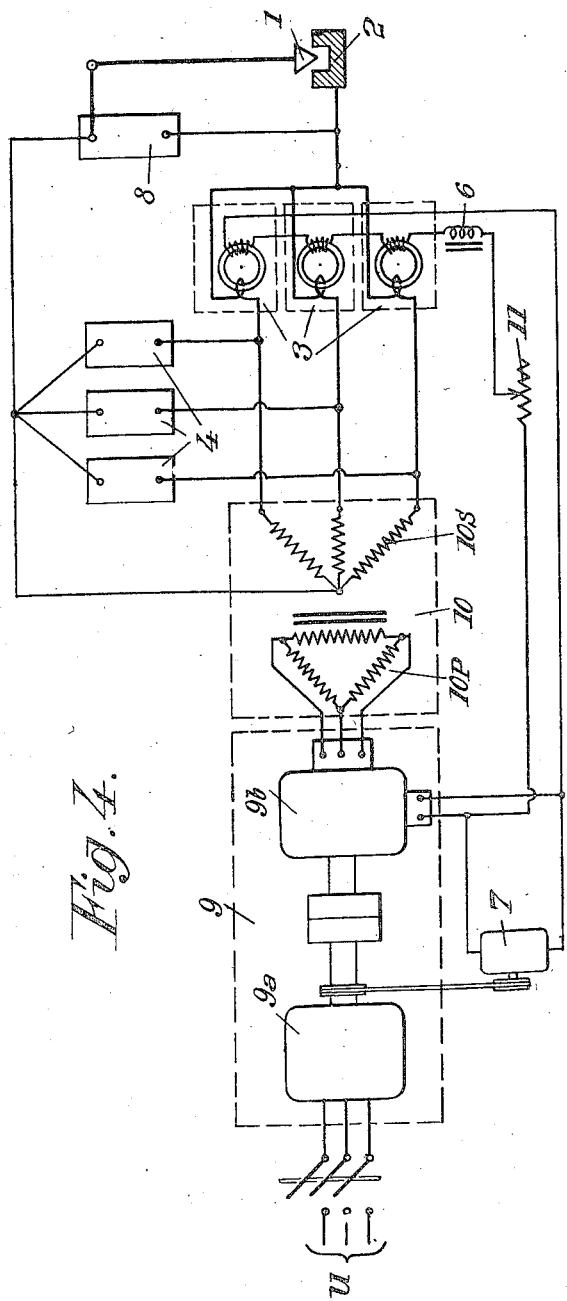
Fig. 4 shows another embodiment of the device according to the invention.

Fig. 4 shows another embodiment of the invention in which a polyphase alternating current source, for instance a three-phase source, of high frequency, produces through several, for instance three, identical circuits unidirectional machining sparks between the tool and the piece of work, the frequency of production of said sparks being equal to a multiple, in this case three times, the frequency of said polyphase source. Fig. 4 shows three energy accumulator systems 4 and three magnetic switching means 3 which may be controlled by a single bias circuit. At 9 is shown the source constituted by a rotary frequency converter group including a motor 9a driving a three-phase alternator 9b the frequency of which ranges from 100 to 10,000 cycles per second (this in accordance with the magnetic materials which are presently known and available to constitute magnetic switching means as above described); the effective voltage of said alternator ranges preferably from 50 to 1500 volts.

7 designates a direct current source for energizing said alternator which may be constituted by a small auxiliary generator, driven by the same motor 9a and which may be used at the same time as common bias source for the magnetic switching means. Such an arrangement has the advantage of placing the bias voltage under control of the value of the alternating voltage produced by said alternator, which makes it possible to vary said alternating voltage (and therefore the rate of machining and the roughness of the surface of the machined pieces) without disturbing the adjustment of said switching means, the magnitude of inductance 6 being suitably chosen and the value of adjustable resistance 11 suitably adjusted.

10 shows a transformer the primary 10P of which is triangle arranged and the secondary 10S of which is star disposed; this tarnsformer makes it possible to dispose each of the phases with respect to the neutral point in a manner equivalent to that shown in the circuit of Fig. 1, each of the phases producing, as above explained, a machining spark the sparks produced by the different phases being electrically at 120° from one another. Consequently the frequency of production of the machining sparks is equal to three times the frequency $f$ of the source. Thus with the materials available at the present time, with a 6000 cycles per second three-phase alternator, the unidirectional machining sparks will be obtained at the rate of 18000 sparks per second.

The curves of Fig. 5 make it possible to understand the operation of the device of Fig. 4. $\varphi_1$, $\varphi_2$ and $\varphi_3$ represent the three-phase voltage waves produced by alternator 9b, whereas curves $d_1$, $d_2$, $d_3$ represent the machining discharges (either voltage or current) taking place between the tool and the piece to be machined.

A device according to the invention has among others the following advantages.

Its construction is simple and reliable and includes only electro-mechanical components, without requiring electronic or glass tube components.

It is possible to increase the frequency of the sparks and therefore the rate of machining without increasing the roughness of the surfaces thus machined.

The efficiency is higher, in particular due to the elimination of rectifying means when the source of current is an alternating one.

It is unnecessary to provide any protecting means against a possible short-circuiting taking place between the electrode-tool and the piece, due to a mistake in the operation of the device, because no dangerous voltage increase can take place across the terminals of the reactive energy accumulator system. Indeed the ferro-resonant magnetic switch acts as a voltage maximum relay.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. A device for machining by means of electric sparks a piece made of an electricity conducting material which comprises, in combination, an electrode-tool, a source of alternating voltage including a reaction energy accumulator, a circuit including said source, said electrode and means for connection to said piece, and magnetic ferro-resonant switching means arranged in said circuit to cause a unidirectional current peak in said circuit only on every alternation in one direction of the alternating voltage of said source, whereby unidirectional current discharges are produced between said electrode and said piece, without the alternating voltage of said source having to be rectified through conventional rectifying means.

2. A device according to claim 1 in which said switching means includes a saturation magnetic circuit and two windings on said circuit, an adjustable bias source having its terminals connected with the respective ends of one of said windings, the other winding being inserted in the circuit including said electrode and said piece.

3. A device according to claim 1, said source of alternating voltage including a reactive energy accumulator arranged so that the voltage at the terminals thereof passes through a maximum every time the input voltage passes through zero value, said switching means being arranged to produce a sudden transfer of energy from said energy accumulator to the space between the electrode and the piece of work every time the voltage at the terminals of the reactive energy accumulator system passes through a maximum.

References Cited in the file of this patent

UNITED STATES PATENTS

| | | |
|---|---|---|
| 1,146,988 | Arendt | July 20, 1915 |
| 1,952,505 | Landis | Mar. 27, 1934 |
| 2,049,377 | Hobart | July 28, 1936 |
| 2,171,512 | Crout | Aug. 29, 1939 |
| 2,417,622 | Walsh | Mar. 18, 1947 |
| 2,501,954 | McKechnie et al. | Mar. 28, 1950 |

FOREIGN PATENTS

| | | |
|---|---|---|
| 759,864 | France | Dec. 6, 1933 |